United States Patent
Cargille et al.

(10) Patent No.: US 8,924,356 B2
(45) Date of Patent: Dec. 30, 2014

(54) CHECKPOINTS FOR A FILE SYSTEM

(75) Inventors: Jonathan M. Cargille, Seattle, WA (US); Thomas J. Miller, Yarrow Point, WA (US); William R. Tipton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/530,269

(22) Filed: Jun. 22, 2012

(65) Prior Publication Data

US 2012/0259816 A1 Oct. 11, 2012

Related U.S. Application Data

(63) Continuation of application No. 12/815,418, filed on Jun. 15, 2010, now Pat. No. 8,224,780.

(51) Int. Cl.
*G06F 17/30* (2006.01)

(52) U.S. Cl.
CPC ...................................... *G06F 17/30* (2013.01)
USPC .................................. 707/649; 707/E17.005

(58) Field of Classification Search
CPC ..... G06F 17/3017; G06F 17/30; G06F 9/466; G06F 11/2064; G06F 9/467; G06F 11/1402; G06F 17/30227; G06F 12/0815; G06F 11/1471; G06F 9/30087; G06F 17/30067; G06F 3/0643; G06F 11/1474; G06F 3/0631
See application file for complete search history.

(56) References Cited

U.S. PATENT DOCUMENTS

| | | | |
|---|---|---|---|
| 4,959,771 A * | 9/1990 | Ardini et al. | 711/136 |
| 5,864,657 A | 1/1999 | Stiffler | 714/15 |
| 6,035,399 A | 3/2000 | Klemba et al. | 726/1 |
| 6,185,663 B1 * | 2/2001 | Burke | 711/156 |
| 6,571,259 B1 * | 5/2003 | Zheng et al. | 1/1 |
| 6,629,198 B2 * | 9/2003 | Howard et al. | 711/112 |
| 6,678,809 B1 * | 1/2004 | Delaney et al. | 711/162 |
| 6,721,764 B2 * | 4/2004 | Hitz et al. | 1/1 |
| 6,779,001 B1 * | 8/2004 | Kanai et al. | 1/1 |
| 6,892,211 B2 | 5/2005 | Hitz et al. | |
| 6,993,539 B2 | 1/2006 | Federwisch et al. | |

(Continued)

FOREIGN PATENT DOCUMENTS

WO    WO 2007/127361    11/2007

OTHER PUBLICATIONS

Oren Laadan, Transparent Checkpoint-Restart of Distributed Applications on Commodity Clusters, 2005 IEEE, pp. 1-13.

(Continued)

*Primary Examiner* — Michelle Owyang
(74) *Attorney, Agent, or Firm* — John Jardine; Kate Drakos; Micky Minhas

(57) ABSTRACT

Aspects of the subject matter described herein relate to checkpoints for a file system. In aspects, updates to the file system are organized into checkpoint buckets. When a checkpoint is desired, subsequent updates are directed to another checkpoint bucket. After global tables have been updated for updates in the current checkpoint bucket, a logical copy of the global tables is created. This logical copy is stored as part of the checkpoint data. To assist in recovery, a checkpoint manager may wait until all updates of the current checkpoint bucket have been written to storage before writing final checkpoint data to storage. This final checkpoint data may refer to the logical copy of the global tables and include a validation code to verify that the checkpoint data is correct.

17 Claims, 8 Drawing Sheets

(56) References Cited

U.S. PATENT DOCUMENTS

| | | | |
|---|---|---|---|
| 7,054,960 B1* | 5/2006 | Bezbaruah et al. | 710/33 |
| 7,168,001 B2* | 1/2007 | Johnson et al. | 714/13 |
| 7,216,254 B1 | 5/2007 | Rajan et al. | |
| 7,412,460 B2 | 8/2008 | Hrle | |
| 7,634,594 B1 | 12/2009 | Bezbaruah et al. | |
| 7,870,356 B1 | 1/2011 | Veeraswamy et al. | 711/162 |
| 2002/0078244 A1* | 6/2002 | Howard | 709/248 |
| 2002/0091718 A1 | 7/2002 | Bohannon et al. | 707/202 |
| 2004/0216130 A1* | 10/2004 | Keller et al. | 719/315 |
| 2004/0260726 A1 | 12/2004 | Hrle | |
| 2007/0276878 A1 | 11/2007 | Zheng | |
| 2008/0040385 A1 | 2/2008 | Barrall | |
| 2009/0094582 A1 | 4/2009 | Craft | |

OTHER PUBLICATIONS

Bowen et al. Processor-and Memory-based Checkpoint and Rollback Recovery, 1993 IEEE, pp. 22-30.

PCT Search Report, for Application No. PCT/US20111038811, Dec. 23, 2011.

Castro, et al., "Implementation", Retrieved at << http://www.usenix.org/events/osdi99/full_papers/castro_html/node6.html >>, Retrieved Date: Mar. 29, 2010, pp. 4.

Laadan, et al., "Transparent Checkpoint-Restart of Multiple Processes on Commodity Operating Systems", Retrieved at << http://www.ncl.cs.columbia.edu/publications/usenix2007_fordist.pdf >>, USENIX Annual Technical Conference on Proceedings of the USENIX Annual Technical Conference, Jun. 17-22, 2007, pp. 323-336.

Philips, Brandon, "The 2007 Linux Storage and File Systems Workshop", Retrieved at << http://lwn.net/Articles/226351/>>, Mar. 19, 2007, pp. 19.

"Information that Every Oracle Database Administrator Should Know", Retrieved at<< http://eval.symantec.com/ mktginfo/products/White_Papers/Data_Protection/nbu_oracle_essential_wp_100404.pdf>>, White Paper, pp. 23, 2004.

"Solaris ZFS—A Better, Safer Way to Manage Your Data", Retrieved at << http://www.sun.com/software/solaris/ds/zls.jsp >>, Retrieved Date: Mar. 29, 2010, pp. 5.

Santry, et al., "Elephant: The File System that Never Forgets", Retrieved at << http://cs.sunysb.edu/~ezk/cse590-s07/regulatory/elephant.pdf>>, HOTOS, Proceedings of the The Seventh Workshop on Hot Topics in Operating Systems, Mar. 28-30, 1999, pp. 6.

CN Search Report for Application No. 201180029522.9, Jul. 25, 2013.

AU Patent Examination Report No. 1 for Application No. 2011265653, Feb. 28, 2014.

Castro, "Practical Byzantine Fault Tolerance", Proceedings of the Third Symposium on Operating Systems Design and Implementation, Feb. 1999.

* cited by examiner

CHECKPOINTS FOR A FILE SYSTEM

CROSS-REFERENCE TO RELATED APPLICATION

This application is a continuation of and claims benefit from U.S. patent application Ser. No. 12/815,418, filed Jun. 15, 2010, which is incorporated herein by reference in its entirety.

BACKGROUND

A power outage or system failure may occur in the middle of writing data to a storage device. When this happens, data may be lost or become inconsistent. For example, if a system fails in the middle of an account holder withdrawing money from an ATM the transaction may unfairly favor the bank or the account holder. As another example, if a system fails during a lengthy computation involving disk accesses, it may take significant time to redo the computation.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to checkpoints for a file system. In aspects, updates to the file system are organized into checkpoint buckets. When a checkpoint is desired, subsequent updates are directed to another checkpoint bucket. After global tables have been updated for updates in the current checkpoint bucket, a logical, copy of the global, tables is created. This logical copy is stored as part of the checkpoint data. To assist in recovery, a checkpoint manager may wait until all updates of the current checkpoint bucket have been written to storage before writing final checkpoint data to storage. This final checkpoint data may refer to the logical copy of the global tables and include a validation code to verify that the checkpoint data is correct.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
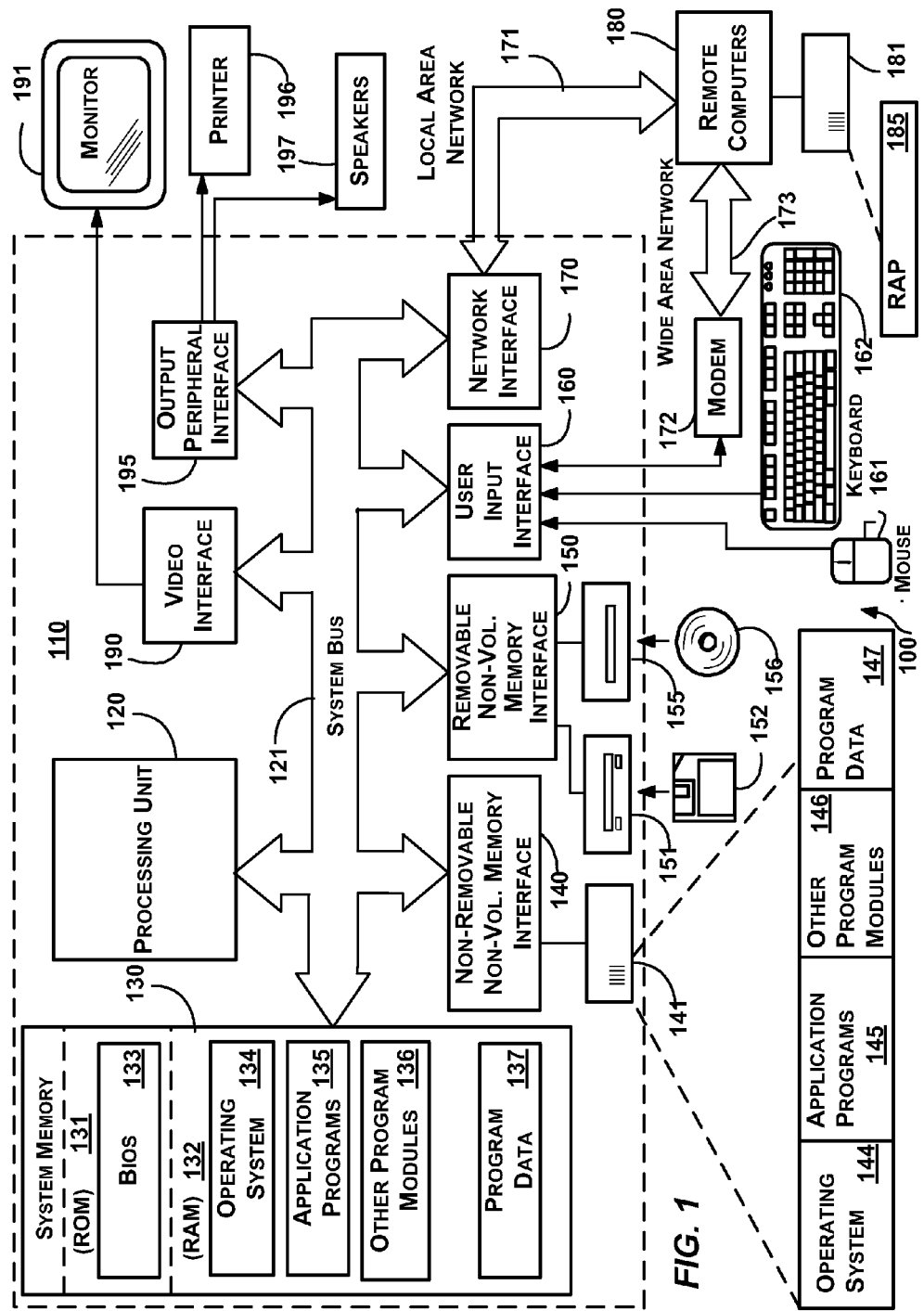
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. PAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to she system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different, copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected so the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are common place in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Checkpointing

As mentioned previously, power outages and system failures may occur while writing data to a storage device. This may leave the data stored on the storage device in an inconsistent state. To address this and other problems, checkpoints may be written to the storage device.

Figure 2:
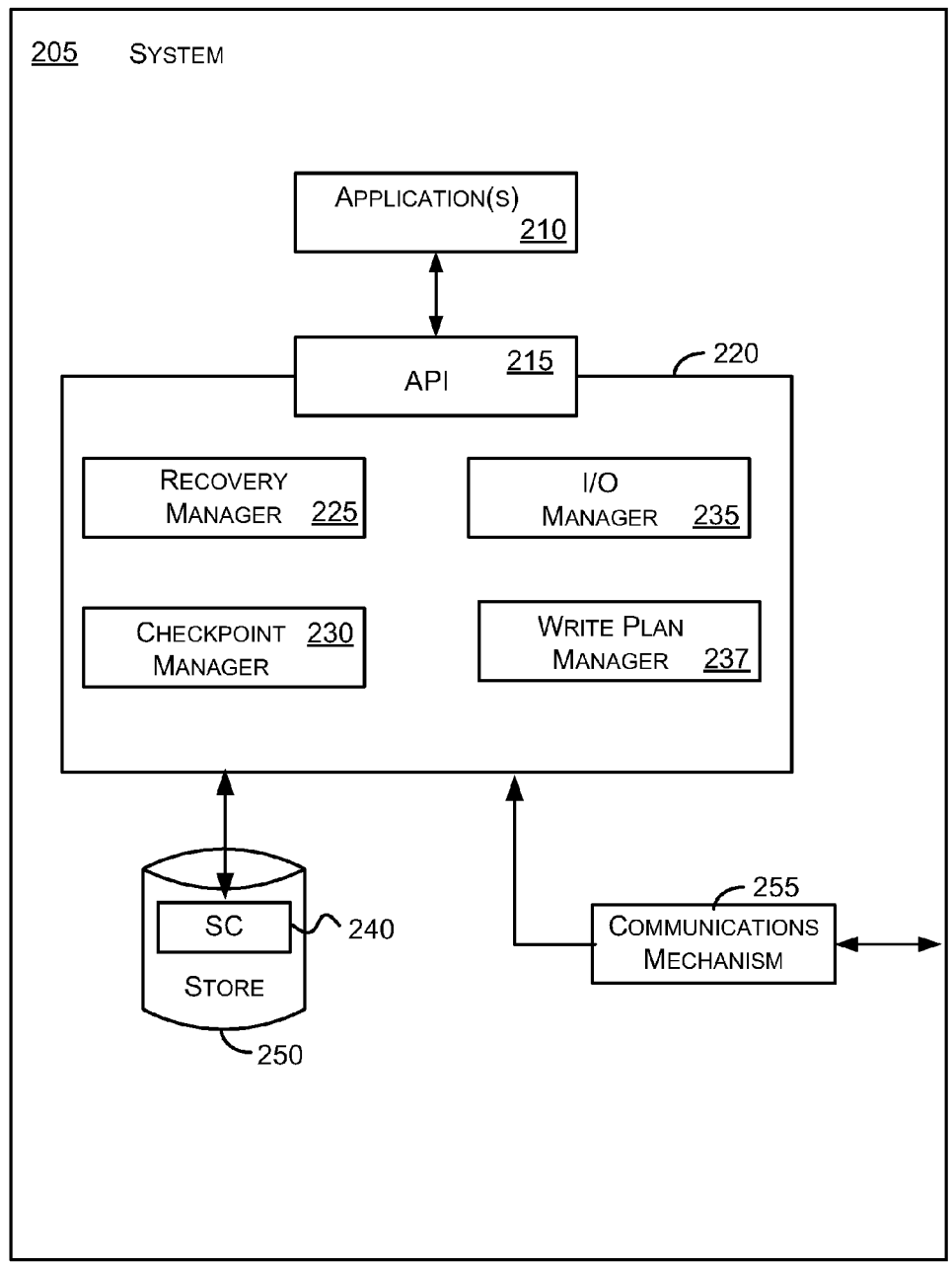
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. The components illustrated in FIG. 2 are exemplary and are not means to be all-inclusive of components that may be needed or included. In other embodiments, the components and/or functions described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the system 205 may include one or more applications 210, an API 215, file system components 220, a store 250, a communications mechanism 255, and other components (not shown). The system 205 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 205 comprises a single device, an exemplary device that may be configured to act as the system 205 comprises the computer 110 of FIG. 1. Where the system 205 comprises multiple devices, each of the multiple devices may comprise a similarly or differently configured computer 110 of FIG. 1.

The file system components 220 may include a recovery manager 225, a checkpoint, manager 230, an I/O manager 235, a write plan manager 237, and other components (not shown). As used herein, the term component is to be read to include all or a portion of a device, a collection of one or more software modules or portions thereof, some combination of one or more software modules or portions thereof and one or more devices or portions thereof, and the like.

The communications mechanism 255 allows the system 205 to communicate with other entities. For example, the communications mechanism 255 may allow the system 205 to communicate with applications, on a remote host. The communications mechanism 255 may be a network interface or adapter 170, modem 172, or any other mechanism for establishing communications as described in conjunction with FIG. 1.

The store 250 is any storage media capable of providing access to data. The store may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 250 may comprise hard disk storage, other non-volatile storage, volatile memory such as RAM, other storage, some combination of the above, and the like and may be distributed across multiple devices. The store 250 may be external, internal, or include components that are both internal and external to the system 205.

The store 250 may be accessed via a storage controller 240. Access as used herein may include reading data, writing data, deleting data, updating data, a combination including two or more of the above, and the like. The storage controller 240 may receive requests to access the store 250 and may fulfill such requests as appropriate. The storage controller 240 may be arranged such that it does not guarantee that data will be written to the store 250 in the order that it was received. Furthermore, the storage controller 240 may indicate that it has written requested data before the storage controller 240 has actually written the data to a non-volatile memory of the store 250.

The one or more applications 210 include any processes that may be involved in creating, deleting, or updating data. Such processes may execute in user mode or kernel mode. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. The one or more applications 210 may make file system requests (e.g., via function/method calls) through the API 215 to the I/O manager 235.

The I/O manager 235 may determine what I/O request or requests to issue to the storage controller 240 (or some other intermediate component). The I/O manager 235 may also return data to the one or more applications 210 as operations associated with the file system requests proceed, complete, or fail. When a file system request involves a transaction, the I/O manager 235 may inform a transaction manager (not shown) so that the transaction manager may properly manage the transaction. In some embodiments, the functions of the transaction manager may be included in the I/O manager 235.

The file system components 220 may use copy on write, write in place, a combination of the above, and the like in writing file system objects or metadata regarding file system objects to the store 250. The term "file" may include a directory, a file system object that does not have children (e.g., what is sometimes thought as a file), other file system objects, and the like.

In copy on write, before data of a file is modified, a copy of the data that is to be modified is copied to another location. In a write in place, data of a file may be modified in place without copying the original data to another location. A hybrid of copy on write and write in place may include performing copy on write for metadata regarding a file while performing write in place for data included in the file.

Objects of a file system may be updated in the context of transactions. A transaction is a group of operations that may be described by various properties including, for example, atomic, consistent, isolated, and durable. As used herein, a transaction may be defined by at least the consistent property and may also be defined by one or more of the other properties above.

The consistent property refers to an allowed state of data with respect to one or more files. Before a transaction begins and after a transaction completes, the files of a files system are to be in an allowed state (although they may pass through un-allowed states during the transaction). For example, a bank transfer may be implemented as set of two operations: a debit from one account and a credit to another account. Consistency in this example may be defined as having the combined account balance of the bank and the account holder be a constant (e.g., T=A+B, where T is a constant, A=Bank Balance, B=Account Holder Balance). To implement consistency in this example, the debit and credit operations simply need to be for the same amount of money and either both be completed or neither completed on each account.

A checkpoint may be written to indicate a consistent state of the file system. A checkpoint may include one or more validation codes (e.g., one or more checksums, hashes, or other data) that may be used to determine whether the checkpoint and/or data associated with the checkpoint was correctly written to disk. Upon recovery, the last written checkpoint may be located. The validation code (s) of the checkpoint may then be used to determine whether the checkpoint and/or data associated with the checkpoint were correctly written to disk if not, a previous checkpoint may be located and checked for validity until a valid checkpoint is found. Once the most recent valid checkpoint is found, a last consistent state of the file system is known. File system operations that occur after this point may be discarded or additional recovery actions may be performed as desired.

In one embodiment, an object on a file system may be denoted by $D_n$ where n identifies the object to a system. Objects on the file system are serializable (i.e., able to be represented as data on the store 250) and de-serializable. An object table associates each object identifier with its location on the store 250.

The first time $D_n$ is updated in a modifying transaction, $D_n$ is located by looking up its location in the object table using n. For use in an example, the storage location of $D_n$ on the store 250 is called $L_1$.

The contents of $L_1$ are then read from the store 250, the object may be de-serialized (e.g., converted from the serialized format into a structure of the object), and the portions of the object that are to be modified are copied into main system memory. The updates are performed on the portions (or copies thereof) in memory. In conjunction with the portions in memory being modified, one or more new locations (call this $L_2$) on the store 25 is designated for the modified portions.

These copies in main system memory are sometimes called herein "logical copies" of the objects. A logical copy of an object includes one or more data structures that can be used to represent the object. Logically, a logical copy is a duplicate of an object. Physically, a logically copy may include data (including pointers to other data) that may be used to create a duplicate of the object. For example, in one implementation, a logical copy may be an actual copy (e.g., bit-by-bit copy) of the object or a data structure that includes data that can be used to create the object.

In another implementation, an unmodified logical copy may include one or more pointers that refer to the original object. As the logical copy is modified, pointers in the logical copy may refer to new memory locations (e.g., for the changed portion of the logical copy) while other pointers may refer to portions of the original object (e.g., for the non-changed portion of the logical copy). Using the pointers, the modified copy may be constructed using the modified data together with the non-modified data of the original object. Creating a logical copy may be performed, for example, to reduce the storage needed to create a duplicate of an object.

Furthermore, although serialization and de-serialization are sometimes referred to herein, there is no intention to limit aspects of the subject matter described herein to what is customarily thought of as serialization and de-serialization. In one embodiment, the serialized version may be bit-for-bit identical to the de-serialized version. In another embodiment, the bits of the serialized version may be packaged in a different format and order than those in the de-serialized version. Indeed, in one embodiment, serialization and de-serialization are to be understood to mean any mechanism for storing and retrieving data that represents objects from a store. The other mechanisms, for example, may include writing properties of the objects in text format to the store, encoding properties of the objects in a markup language in the store, other ways of storing properties and other features of the objects on the store, and the like.

At the system's discretion (e.g., after a transaction commits or some other time), the system may serialize the modified logical copy back to the stable medium but does so at location $L_2$. The intention to write the modified logical copy back to the new location is called a write plan. A write plan may identify an arbitrary number of updates to one or more objects. A write plan may reference changes that occur in more than one transaction. Multiple write plans may be combined into a single write plan.

The write plan manager 237 may be involved with creating write plans for various updates. When a write plan involves multiple file system objects (e.g., in the context of a transaction), the write plan manger 237 may be operable to generate a write plan that indicates locations on the storage of all file system objects involve in the transaction in order to maintain a consistent state for the file system.

When a modification occurs just after a checkpoint, a block called the recovery block (which may be duplicated in multiple locations) may be modified to point to the start of the modified logical copy (i.e., $L_2$). A field in the object at $L_2$ points to the location that will be written to next. This field represents a link in a chain of write plans that occur between checkpoints.

In conjunction with sending a request to write a logical copy, a modification may be made to the object table. In particular, the location value indexed by the identifier of the object may be set to the value of the location at which the modified logical copy is to be stored (i.e., $L_2$). This is done so that a subsequent lookup of the location of object $D_n$ will be referred to the location $L_2$, the new version of the object.

If a transaction modifies more than one object, for example $D_i$ and $D_j$, the objects are considered to be "atomically bound" to one another, and are written in one write plan. A write plan may specify this relationship (e.g., in links to the objects involved).

An arbitrary number of objects may be persisted in this manner. Periodically, the object table may also be written to the store 250 in the same manner as any other object.

In conjunction with sending a request to write the object table to the store 250, a flush command may also be sent to the storage controller 240. A flush command instructs the storage controller 240 to write all data from its volatile memory that has not already been written to the non-volatile memory of the store 250.

Periodically, a checkpoint may be written to storage as will be described in more detail below. A checkpoint may be indicated by a checkpoint record being stored by the store 250. A checkpoint may be written at any time and may become stable/durable after flush. Stable/durable refers to the checkpoint being stored on non-volatile memory of the store.

After a checkpoint is stable/durable, space used for any old and unused copies of objects (or portions thereof) may be reused. After the flush completes, the recovery block is then pointed to the start of a chain of the next write plans. In one embodiment, the recovery block may point the start of the chain of write plans to the new location of the object table.

Figure 3:
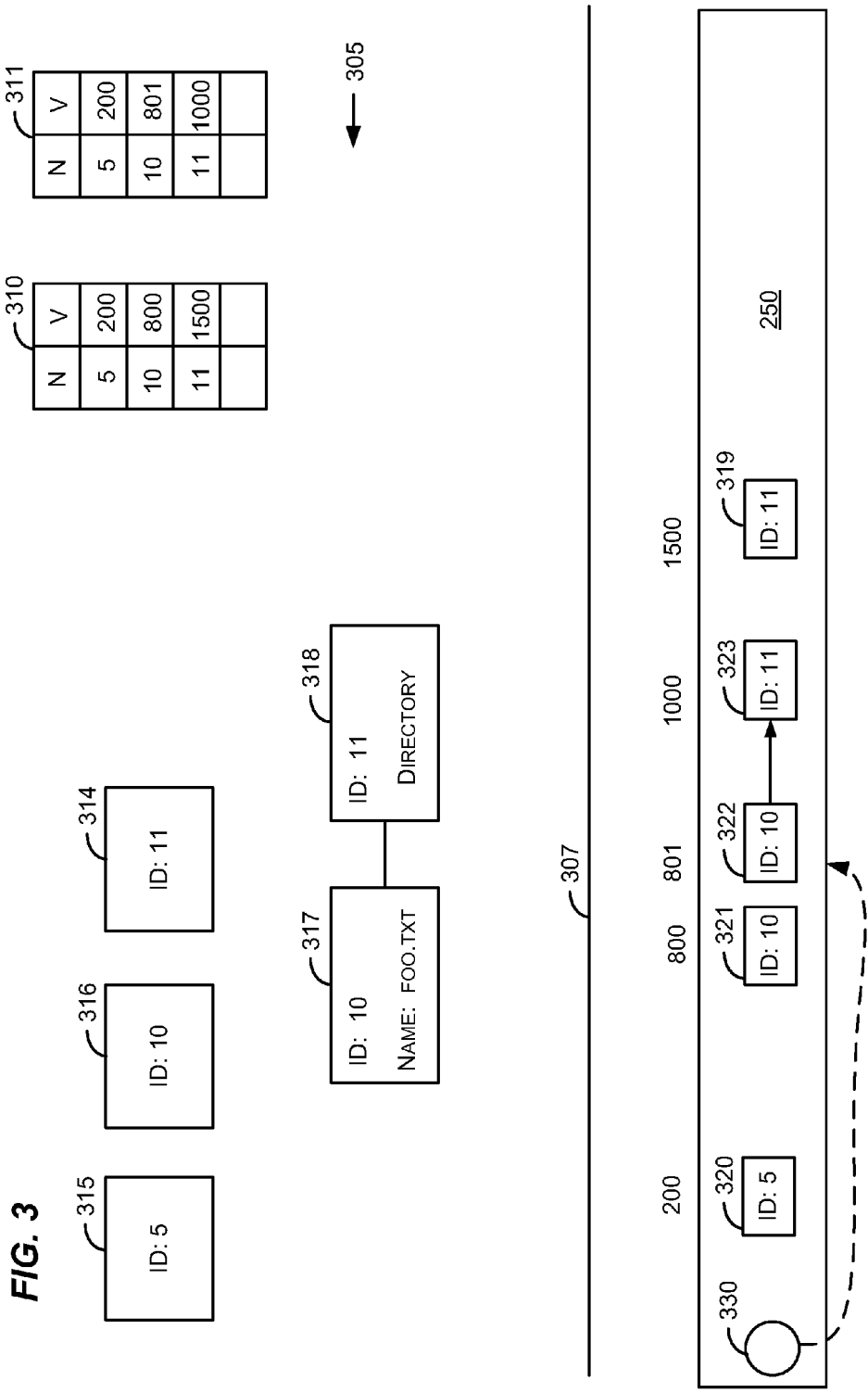
FIG. 3 is a block diagram that illustrates aspects of the subject matter described herein.

A more concrete example is described in conjunction with FIG. 3, which is a block diagram that illustrates aspects of the subject matter described herein. As illustrated, FIG. 3 shows a main memory 305 and a score 250. The line 307 represents a division between the main memory 305 and the store 250. Objects above the line 310 are in main memory while objects below the line 310 are in volatile or non-volatile memory of the store 250.

The objects 314-316 are shown in the main memory 305. In implementation, the objects 314-316 may be de-serialized logical copies of the objects 319-321, respectively. The object 319 is located at location 1550 on the store 250, the object 320 is located at location 200 on the store 250, and the object 321 is located at location 800 on the store 250.

The object table 310 includes key value pairs that indicate locations of the objects 314-316 on the store 250. The key value pairs are indexed using the identifiers (n) of the objects 314-316.

When a transaction modifies the object 316 (e.g., by changing its name to foo.txt), the consistency components (e.g., the consistency components 220 of FIG. 2) may determine a new storage location for the updated object (e.g., location 801) If the object is a file, updating its name in the context of a transaction may also cause the directory that includes the file to also be involved in the transaction. For example, when a file name is changed, both the object chat represents the file and the object that represents the directory that includes the file may need to be involved in the transaction. In this case, the directory that includes the object is represented as object 314 and a logical copy of the updated directory (e.g., object 318) is represented as object 323 in the store 250. Also, the table 310 has been logically updated to the table 311 to indicate the new storage locations (i.e., 801 and 1000) of the modified objects (i.e., the objects 317 and 318).

That a modification of an object within the context of a transaction also affects another object may be explicitly indicated or determined, for example, by the I/O manager 235 or some other component of FIG. 2.

When two or more objects are involved in an update of a transaction, the objects are considered to be "atomically bound" as mentioned previously. In a recovery operation, unless changes are found in the store 250 for all objects changed in the context of the transaction, all of the changes found are discarded. In other words, if changes for one of the objects are found but changes for another of the objects are not found, the changes for the one of the objects are discarded.

To atomically bind two or more objects, in one embodiment, a pointer may be stored or otherwise associated with each object in the store 250. A pointer may indicate the storage location of another object (or portion thereof) involved in the transaction. If there are no additional objects involved in the transaction, the pointer may point to a "dead block" or indicate the storage location of a "head" object of another write plan. This head object may comprise a write plan, a modified object (or portion thereof) of the write plan, or the like.

In addition to pointers to next storage locations, data may also be stored in the store 250 to indicate the correct contents of the object "pointed" to. For example, a hash may be stored that indicates the correct content of a pointed to object.

In the example presented in FIG. 3, a pointer associated with the object 322 may point to a storage location associated with the object 323. The pointer hinds the two objects together. If during recovery, either of the objects is not found or they do not have she correct content, she changes represented by found objects may be discarded.

Because of the nature of the store 250, there may be no guarantee as to which object will be written first to non-volatile memory of the store 250. If the object 322 is written first and the object 323 is not written, the pointer from object 322 will point to a storage location that may have spurious data. However, by computing a hash of the data at the storage location and comparing this hash with the hash stored with object 322, the data at location 1000 may be detected as having invalid data. In this case, during recovery, the recovery manager (e.g., the recovery manager 225 of FIG. 2) may discard the changes represented by the objects 322 and 323.

The recovery block 330 points to the first storage location (in this case location 801) at which data was supposed to be stored after a checkpoint. The recovery block 330 may also include or be associated with a hash that is computed using the correct contents of the object stored at the first storage location.

Figure 4:
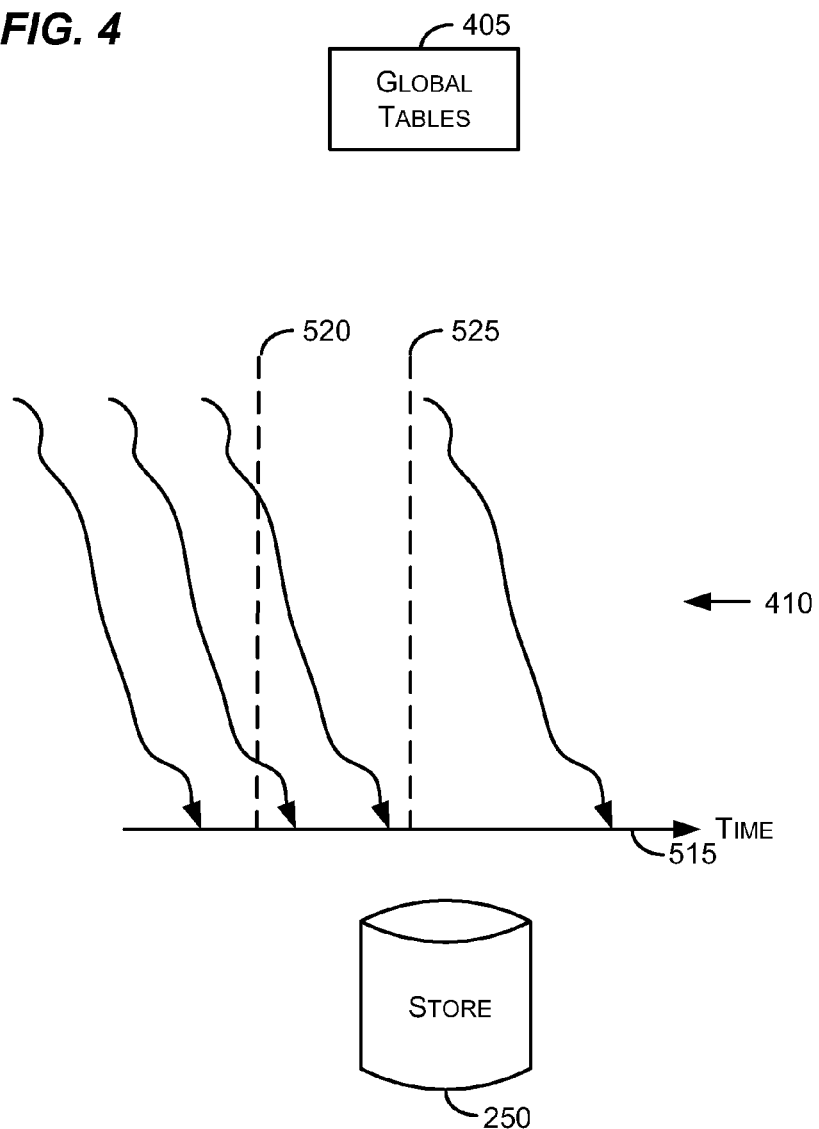
FIG. 4 is a diagram that generally represents updates to a file system in accordance with aspects of the subject matter described herein.

FIG. 4 is a diagram that generally represents updates occurring on a file system in accordance with aspects of the subject matter described herein. The global tables 405 include an object table that identifies locations of objects on the store and allocation data regarding space on the store 250 that has been allocated. Updates 410 that are in progress are also illustrated. When an update touches the time axis 415, the update completes and no longer needs to modify any of the global tables 405. Each of the update lines of the updates 410 may represent multiple updates. Where multiple updates needed to be made together to maintain consistency, the updates may be made in context of transactions.

For a checkpoint to be effective, the checkpoint needs to be written at a consistent state. With a copy on write file system, when an object is updated, a logical copy of the object as modified is stored at a new location of the file system. This new location is reflected in the object table with an update to the object table. For consistency, it would be incorrect for the object table to reflect an update that had not yet been written to disk because the update might not be completely written to disk before a system failure. Similarly, it would also be incorrect for the update to be completed and written to disk and other transactionally-related updates to be completed, but for the object table to not show the update.

To ensure consistency, the checkpoint needs to be selected at a time when metadata for the update is reflected in the global table. If each of the lines representing the updates 410 indicates a period when the global tables 405 may be updated for the update, then performing a checkpoint at time 520 may yield an inconsistent state while performing a checkpoint at time 525 will yield a consistent state.

Figure 5:
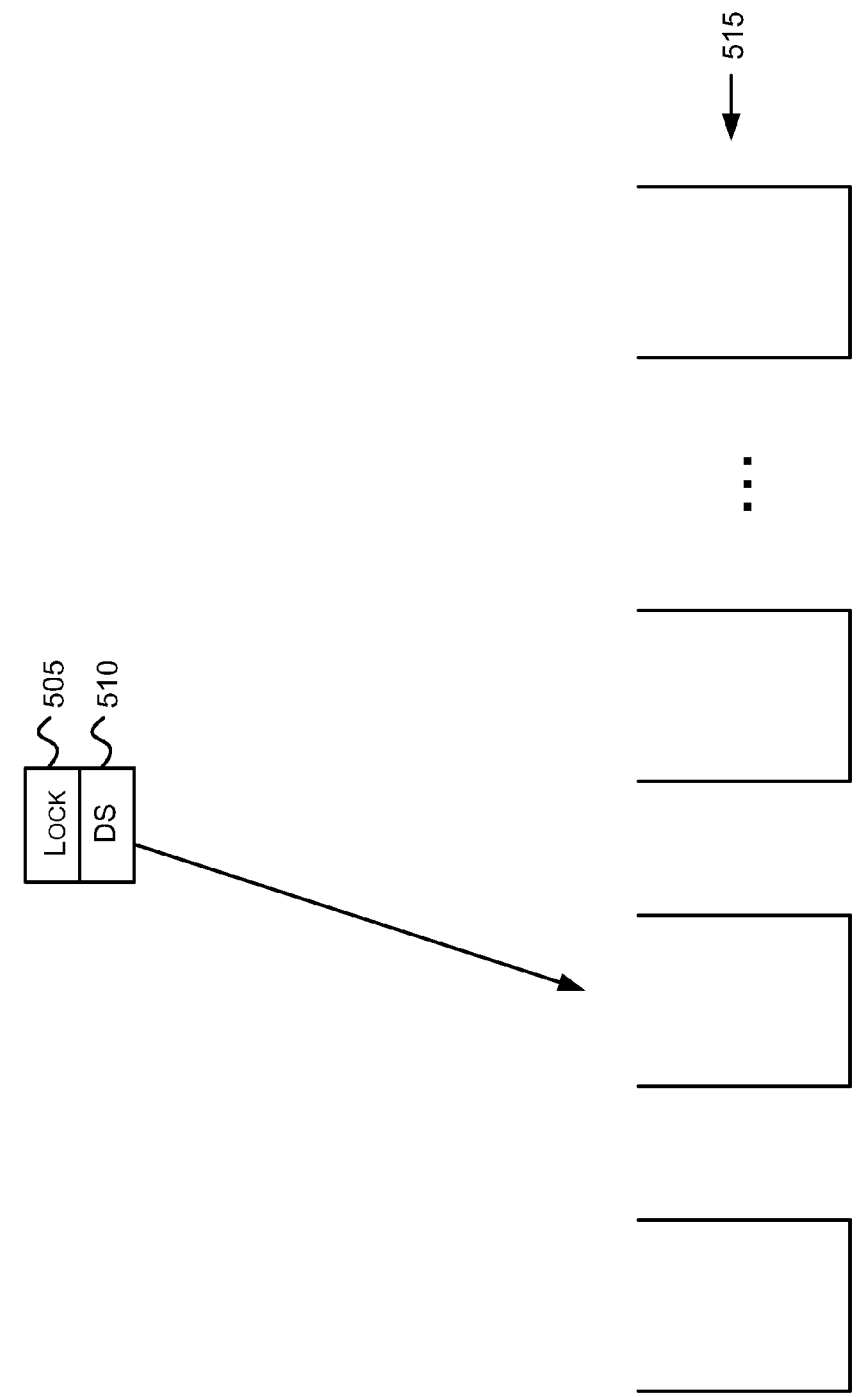
FIG. 5 is a block diagram that illustrates exemplary checkpoint buckets in accordance with aspects of the subject matter described herein.

FIG. 5 is a block diagram that illustrates exemplary checkpoint buckets in accordance with aspects of the subject matter described herein. To address the issues mentioned above and other issues, each update may be associated with a checkpoint bucket (e.g., one of the buckets 515). A checkpoint bucket is a logical concept that indicates that global tables need to be updated to account for at least write plans of updates associated with the checkpoint bucket before checkpoint data of the checkpoint is written to disk. In other words, the global tables need to be updated to account for the location and allocation information of the updates of a bucket even though the updates may or may not currently be written to those locations.

Periodically (e.g., at the expiration of a checkpoint timer based on a recovery window, after a certain number of writes have occurred, after some other threshold is exceeded, or the like), a determination may be made no generate a checkpoint. When this happens, a checkpoint manager may update data (e.g., the data structure 510) that indicates the checkpoint bucket to associate with subsequent updates. For example, the checkpoint manager may obtain an exclusive lock (e.g., the lock 505) on data (e.g., the data structure 510) that indicates the current checkpoint bucket. After the checkpoint manager has obtained an exclusive lock, on the data, the checkpoint manager may update the data to indicate a new checkpoint bucket for subsequent updates. All subsequent updates are associated with the new checkpoint bucket until the data is changed to indicate another checkpoint bucket for subsequent updates.

A checkpoint bucket may be thought of as a logical concept and may be implemented in a variety of ways. For example, in one implementation, a checkpoint bucket may be implemented as a data structure such as a list that has pointers to each of the updates associated with the checkpoint bucket. As another example, the checkpoint bucket may be implemented as data maintained for each update where the data indicates the checkpoint associated with the update. As another example, the checkpoint bucket may be implemented as a counting semaphore. In this example, it may not be known which updates still need to be written to disk, but a count of the updates that still need to be written to disk is known. A read/write lock may be used in this example.

The examples above are not intended to be all-inclusive or exhaustive of the ways of implementing a checkpoint bucket. Indeed, based on the teachings herein, those skilled in the art may recognize many other mechanisms for implementing checkpoint buckets.

After indicating the checkpoint bucket for subsequent updates (e.g., by changing the data structure 510), the checkpoint manager may wait for write plans for all updates in the current checkpoint bucket to be generated. After write plans for all updates in a current checkpoint bucket are generated (but perhaps not written to storage), the checkpoint manager may take a snapshot of the global tables 405 of FIG. 4 and create a write plan to write the snapshot of the global tables 405 to the store. A snapshot may be created as a logical copy of the global tables 405 through copy on write or other mechanisms.

Returning to FIG. 4, write plans for updates subsequent to the checkpoint may be generated and written to disk while the checkpoint manager waits for all updates in the current checkpoint bucket to be generated and also while the checkpoint manager generates a write plan to write a checkpoint. When the checkpoint manager seeks to obtain a snapshot of the global tables, however, the checkpoint manager may obtain an exclusive lock on the global tables 405 prior to creating the snapshot. While the checkpoint manager has an exclusive lock, write plans may still be generated for other updates and these write plans may even be stored on a store, but the global tables (e.g., the object table) may not be updated to point to these write plans until after the checkpoint manager has released its exclusive lock. In conjunction with releasing the lock, the checkpoint manager may send a signal (e.g., raise an event) that indicates that a subsequent checkpoint has been enabled and that subsequent updates may update the global tables.

To assist with recovery, the checkpoint may be written to disk with a validation code to validate the checkpoint according to the following rules:

1. Wait for data indicated by write plans to be written to disk (e.g., wait for all updates associated with the checkpoint to be written to disk);

2. Request that all of the data associated with the checkpoint be written to disk (e.g., request that the logical copy of the metadata be written to disk);

3. Issue or wait for a flush and wait for an acknowledgment that the flush has successfully completed.

4. Generate a validation code for the checkpoint data that was written to disk. In one embodiment, the validation code may be for a subset of the data that was written to disk. For example, if data for a file is stored in a tree where each node of the tree includes validation code for its children, then the validation code may be for the root node of the tree. In this embodiment, the validation code may be written with the root node and may also be used to verify that the validation code is correct.

5. Request that the validation code (and any associated data such as the root node) be written to disk. Note that the validation code may not actually get to disk before system failure. If not then the checkpoint is not a valid checkpoint.

With these rules, during recovery, if the checkpoint is found on storage, and the internal validation code of the checkpoint is valid, the other data associated with the checkpoint is also expected to be stored on the storage and to be valid. If the validation code is included in the root node, the other data in the root node (e.g., pointers to other nodes in the tree) may be used to find the rest of the data corresponding to the checkpoint.

As an alternative, a validation code for each update associated with a checkpoint may be written to storage. For example, the checkpoint may indicate blocks of all updates that were supposed to occur prior to the checkpoint and after the previous checkpoint. For each block indicated, the checkpoint may store a validation code that indicates the correct contents of the block. During recovery in this alternative, to validate a checkpoint, each block may be validated against its associated validation code of the checkpoint.

Returning to FIG. 2, in one embodiment, the checkpoint manager 230 may be operable to perform actions, including:

1. Determining a first checkpoint to associate with requests to update file system objects. As mentioned previously, the checkpoint manager 230 may do this by updating a data structure (e.g., the data structure 510 of FIG. 5) to point to a new checkpoint bucket. Then as each subsequent request to update is received, the request may be assigned to the new checkpoint bucket.

Note that the term "first" as used herein does not mean the very first checkpoint; rather it is used to distinguish from a "second" checkpoint. In other words, if there are N checkpoints, a first checkpoint may be any N where $1<=X<=N$ and a second checkpoint may be any Y where $1<=Y<=N$ and $X<>Y$.

2. Determining when to write checkpoint data associated with the checkpoint to storage of the file system. For example, a checkpoint timer may expire, a number of updates may be exceeded, or some other threshold may be used to determine that it is time to write checkpoint data.

3. Determining a second checkpoint for subsequent requests to update file system objects. As mentioned previously, the checkpoint manager 230 may do this by updating the data structure (e.g., the data structure 510 of FIG. 5) after obtaining an exclusive lock (e.g., the lock 505) on the data structure.

4. Waiting for a consistent state of the file system while allowing preparation to write data for subsequent requests. A consistent state occurs when all of the updates associated with the current checkpoint bucket are represented on (e.g. have been successfully written to) storage. Allowing preparation to write data for subsequent requests includes allowing write plans to be generated and written to storage for the subsequent requests but not allowing metadata (e.g., the global tables) to be updated until after the logical copy of the metadata is created.

5. Creating a logical, copy of metadata of the file system. This may be done by taking a snapshot of the global tables as mentioned previously.

6. Writing the logical copy of the metadata to storage. In one embodiment, this may include requesting that the logical copy be written to storage and waiting for confirmation that the logical copy has been written to storage. In another embodiment, this may include marking the copy on storage as clean so that subsequent updates to the metadata cause copy on write before allowing the updates.

7. Writing at least one validation code to the storage. As mentioned previously, the validation code may be usable to determine whether the updates prior to the checkpoint were written to storage as well as whether the checkpoint record itself is valid.

The API 215 may receive a request to modify an object involved in a transaction. In response, the I/O manager 235 may locate the object in a storage location (e.g., $L_1$) of the store, create a logical copy of she object, make changes to the object in the context of the transaction, determine a second storage location (e.g., $L_2$) for storing the logical copy as changed, send a request to write the logical copy as changed to the storage controller 240, and update a volatile data structure (e.g., the object table 310) to indicate that the logical copy is stored in the second storage location.

If the API 215 receives a request to modify another object involved in the transaction, the I/O manager 235 may perform additional actions, including creating an association (e.g., a write plan) that binds the other object and the first object together. Then, in conjunction with sending a request to write the modifications of the objects to storage, the I/O manager 235 may also send a request to write the association to the storage controller 240.

Figure 6:
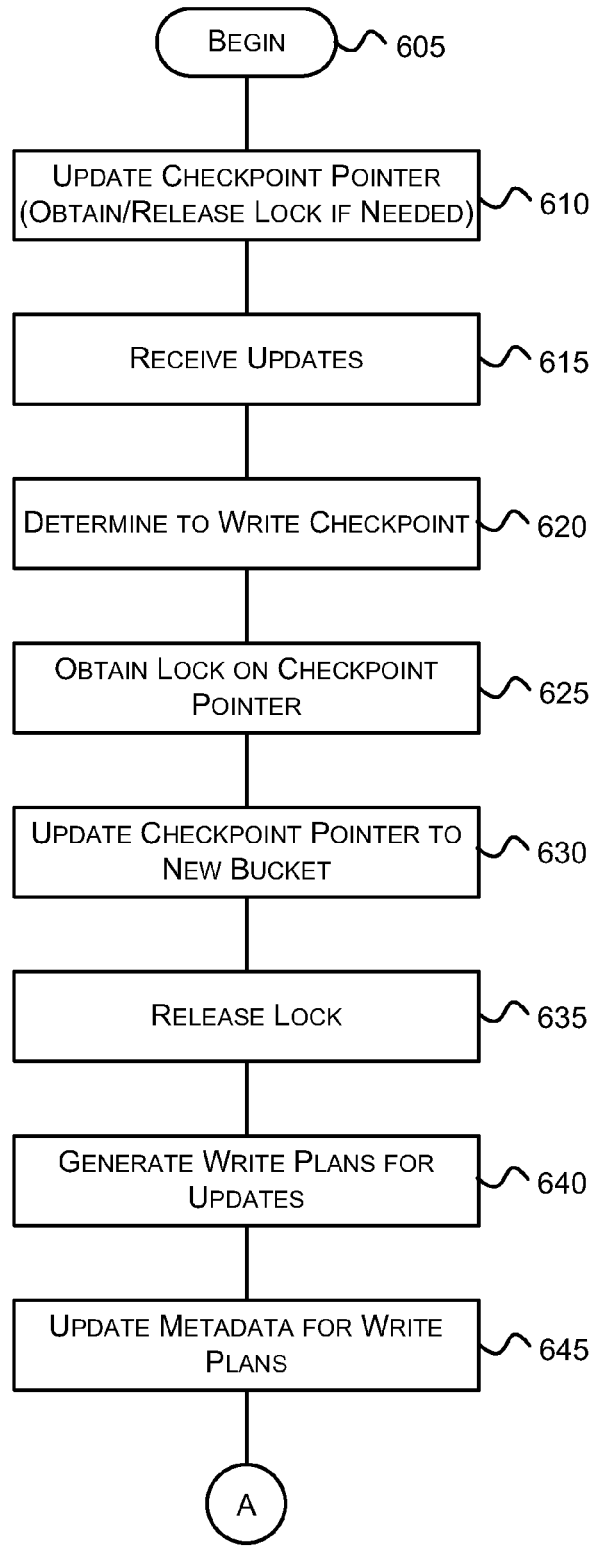
FIGS. 6-8 are flow diagrams that generally represent exemplary actions chat may occur in accordance with aspects of the subject matter described herein.
Figure 7:
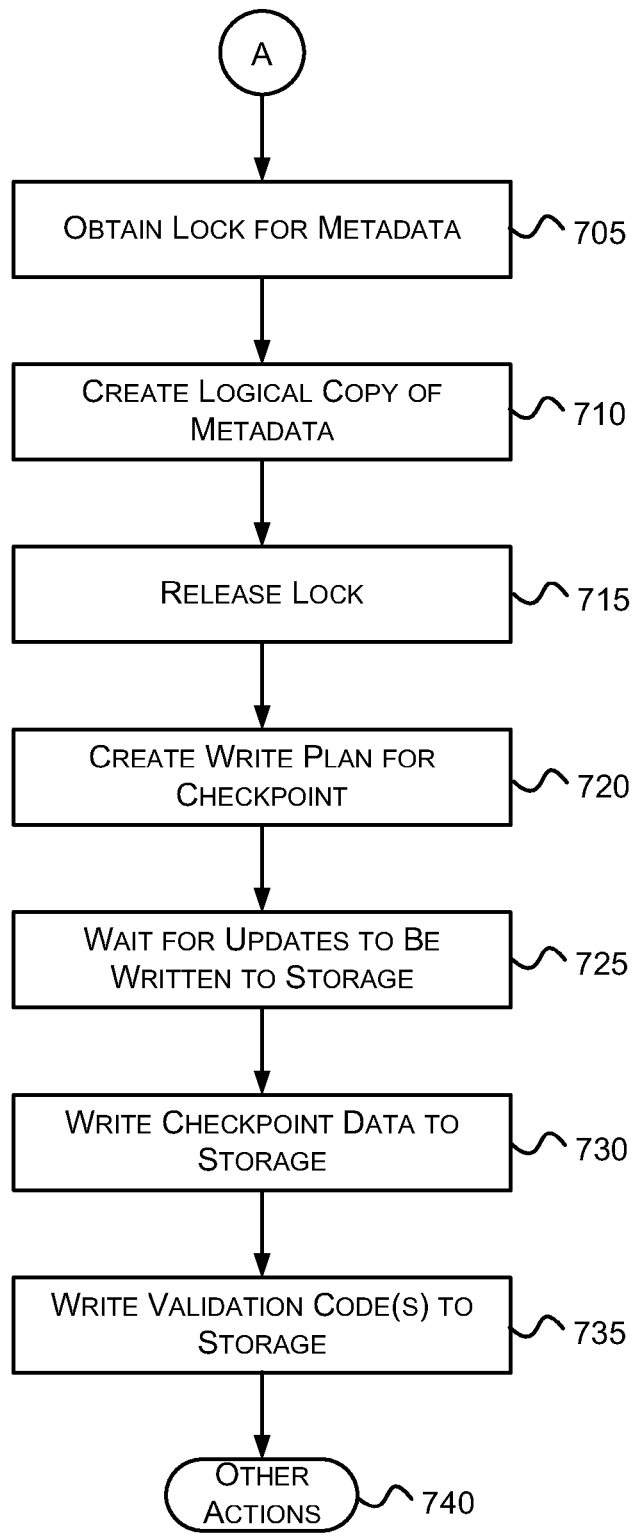
Figure 8:
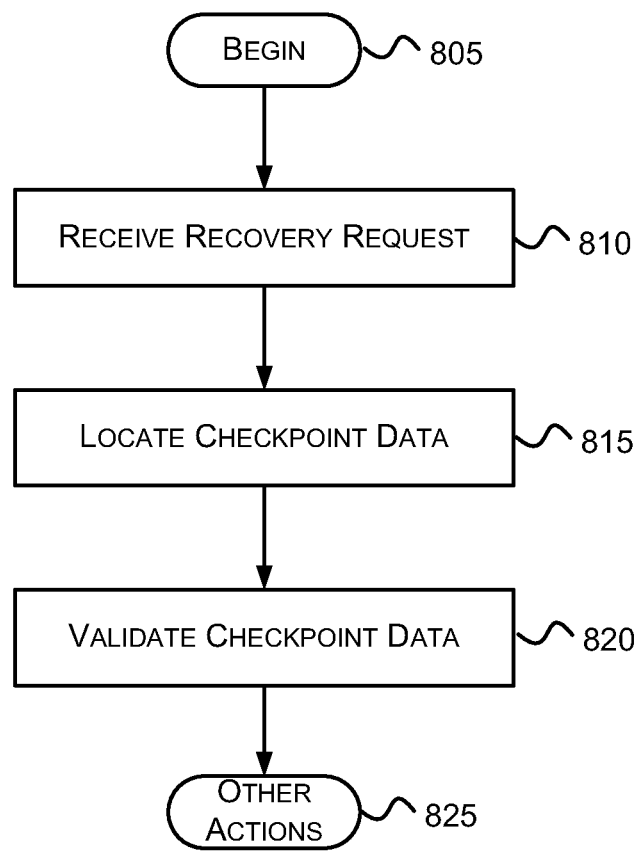

FIGS. 6-8 are flow diagrams that generally represent exemplary actions that may occur in accordance with aspects of the subject matter described herein. For simplicity of explanation, the methodology described in conjunction with FIGS. 6-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, an indication is made that a first set of updates are to be associated with a first checkpoint. This may be done by modifying a data structure to indicate that subsequent updates are to be associated with a first checkpoint. This may involve, for example, obtaining and releasing a lock and updating a pointer or other data structure to refer to a checkpoint bucket as mentioned previously. Note that again "first" may mean any checkpoint of a file system and is used to distinguish this checkpoint from a subsequent checkpoint. For example, referring to FIGS. 2 and 5, the checkpoint manager 230 may obtain the lock 505 on the data structure 510 and update the pointer to point to one of the checkpoint buckets 515.

At block 615, updates are received and associated with the first checkpoint. For example, referring to FIG. 2 the I/O manager 235 may receive update requests from the application(s) 210 via the API 215. As the updates are received, they may be associated with a checkpoint.

At block 620, a determination is made to write checkpoint data of the first checkpoint to storage of a file system. For example, referring to FIG. 2, the checkpoint manager 230 may determine that a checkpoint timer has expired and may determine based thereon that a checkpoint is to be written to the store 250.

At block 625, a lock is obtained on a data structure for indicating checkpoints for subsequent updates. For example, referring to FIGS. 2 and 5, the checkpoint manager 230 may obtain the lock 505 on the data structure 510.

At block 630, the data structure is updated to refer to another checkpoint. Modifying this data structure indicates that any updates that occur subsequent to the first set of updates are to be associated with a subsequent checkpoint. For example, referring to FIGS. 2 and 5, the checkpoint manager 230 may update the data structure 510 to refer to another of the checkpoint buckets 515.

At block 635, the lock is released. For example, referring to FIGS. 2 and 5, the checkpoint manager 230 may release the lock 505.

At block 640, write plans for the updates are generated. Each write plan indicates at least a planned location on storage for data representing at least one of the first set of updates. For example, referring to FIG. 2, the write plan manager 237 may be involved in creating write plans for updates associated with a checkpoint.

At block 645, metadata is updated for the write plans. This metadata indicates storage locations for the write plans (although the write plans may or may not have been written to storage yet). For example, referring to FIG. 2, the write plan manager 237 may update global tables to indicate storage locations object modified by the write plans.

After block 645, the actions continue at block 705 of FIG. 1. Turning to FIG. 7, at block 705, a lock is obtained for the metadata. For example, referring to FIGS. 2 and 4, the checkpoint manager 230 may obtain a lock on the global tables 405. The checkpoint manager 230 may wait until the metadata reflects the storage locations for all updates in the first set of updates (even though all of these updates may or may not have been written to these storage locations).

At block 710, a logical copy of the metadata is created. As mentioned previously, this may involve creating a new copy of the metadata, marking the metadata as clean so that subsequent updates to the metadata cause a copy on write, or some other logical copying mechanism. For example, referring to FIGS. 2 and 4, the checkpoint manager 230 may make a logical copy of the global tables 405.

At block 715, the lock is released. For example, referring to FIGS. 2 and 4, the checkpoint manager 230 may release a lock on the global tables 405.

At block 720, a write plan so write the first checkpoint data is created. Creating this write plan may occur in parallel with write plans being generated (and written to disk) for updates subsequent to the checkpoint as well as data corresponding to current write plans being written to disk. For example, referring to FIG. 2, the checkpoint manager 230 may use the write plan manager 237 to create a write plan for checkpoint data of the first checkpoint. This data may include a logical copy of the global tables previously mentioned.

At block 725, in one embodiment, the checkpoint manager may wait for all updates of the first set of updates to be successfully written to storage. After all updates have been successfully written to storage, the update manager may then write a final checkpoint record that includes a validation code. As mentioned previously, this allows recovery to simply check the validation code to determine whether all updates corresponding to the checkpoint are expected to have been written to storage.

In another embodiment, the checkpoint manager may write several validation codes in a checkpoint record. These validation codes may be associated with storage locations of updates of the first set of updates. In this embodiment, the checkpoint manager may wait for these updates to be written to storage or may write the checkpoint record without waiting. If the latter option is chosen, finding a suitable checkpoint during recovery may be more involved than verifying that a valid checkpoint record is on disk.

At block 730, checkpoint data may be written to storage. This may involve, for example, writing a write plan associated with the checkpoint data to storage. As another example, this may involve writing a checkpoint record to storage that refers to the logical copy of the global tables. For example, referring to FIG. 2, the checkpoint manager 230 may request that a write plan corresponding to the checkpoint data be written to storage.

At block 735, at least one validation code is written to storage. Writing at least one validation code to storage may be combined with writing a checkpoint, record to storage that refers to the logical copies of the global tables. For example, referring to FIG. 2, the checkpoint manager 230 may write a checkpoint record to storage that refers to the logical copies of the global tables and that includes a validation code for verifying the contents of the checkpoint record.

At block 740, other actions, if any, may be performed.

Turning to FIG. 8, at block 805, the actions begin. At block 810, a recovery request is received. For example, referring to FIG. 2, the recovery manger 225 may receive a recovery request to perform recovery for data stored the store 250.

At block 815, checkpoint data is located. For example, referring to FIG. 2, the recovery manager 225 may locate the latest checkpoint data stored on the store 250 (or some other store).

At block 820, the checkpoint data is validated using a validation code. For example, referring to FIG. 2, the recovery manager 225 may compute a checksum of the checkpoint data and compare this checksum to the checksum stored with the checkpoint data. If the checksums match, the checkpoint may be deemed to be valid. If extra validation is desired, the recovery manager may attempt to validate one or more objects indicated by the global tables referred to by the checkpoint data.

At block 825, other actions, if any, may be performed.

As can be seen from the foregoing detailed description, aspects have been described related to checkpoints for a file system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a hardware computing device, the method comprising:
    associating a checkpoint with updates of a plurality of file system objects, where the updates correspond to a transaction, where the file system objects are stored at corresponding first locations on a storage device, and where the updates comprise modified logical copies of at least portions of the file system objects;
    creating a write plan for writing the updates to the storage device at second locations that are different from the first locations while allowing, in parallel with the creating, other write plans to also be created for subsequent updates that occur subsequent to the associating, where the created write plan specifies that the updates are bound to one another in a context of the transaction, and where the created write plan indicates the second locations; and
    writing, based on the created write plan and in response to the updates being written to the storage device at the second locations according to the created write plan, checkpoint information to the storage device, where the checkpoint information comprises the created write plan and a checkpoint record.

2. The method of claim 1 further comprising providing, prior to the associating, an indication that the updates are to be associated with the checkpoint.

3. The method of claim 1 further comprising providing an indication that the subsequent updates are to be associated with a subsequent checkpoint.

4. The method of claim 1 further comprising writing the updates to the storage device at the second locations.

5. The method of claim 1 where the written checkpoint record includes a validation code configured for use in validating the written updates.

6. The method of claim 5 where the validation code is further configured for use in a recovery operation.

7. At least one computer storage media storing computer-executable instructions that, when executed by a computing device, cause the computing device to perform actions comprising:
    associating a checkpoint with updates of a plurality of file system objects, where the updates correspond to a transaction, where the file system objects are stored at corresponding first locations on a storage device, and where the updates comprise modified logical copies of at least portions of the file system objects;
    creating a write plan for writing the updates to the storage device at second locations that are different from the first locations while allowing, in parallel with the creating, other write plans to also be created for subsequent updates that occur subsequent to the associating, where the created write plan specifies that the updates are bound to one another in a context of the transaction, and where the created write plan indicates the second locations; and
    writing, based on the created write plan and in response to the update being written to the storage device at the second locations according to the created write plan, checkpoint information to the storage device, where the checkpoint information comprises the created write plan and a checkpoint record.

8. The at least one computer storage media of claim 7, the actions further comprising providing, prior to the associating, an indication that the updates are to be associated with the checkpoint.

9. The at least one computer storage media of claim 7, the actions further comprising providing an indication that the subsequent updates are to be associated with a subsequent checkpoint.

10. The at least one computer storage media of claim 7, the actions further comprising writing the update to the storage device at the second locations.

11. The at least one computer storage media of claim 7 where the written checkpoint record includes a validation code configured for use in validating the written updates.

12. The at least one computer storage media of claim 11 where the validation code is further configured for use in a recovery operation.

13. A hardware computing device and at least one program module together configured for performing actions comprising:

associating a checkpoint with updates of a plurality of file system objects, where the updates correspond to a transaction, where the file system objects are stored at corresponding first locations on a storage device, and where the updates comprise modified logical copies of at least portions of the file system objects;

creating a write plan for writing the update to the storage device at second locations that are different from the first locations while allowing, in parallel with the creating, other write plans to also be created for subsequent updates that occur subsequent to the associating, where the created write plan specifies that the updates are bound to one another in a context of the transaction, and where the created write plan indicates the second locations; and writing, based on the created write plan and in response to the update being written to the storage device at the second locations according to the created write plan, checkpoint information to the storage device, where the checkpoint information comprises the created write plan and a checkpoint record.

14. The hardware computing device and the at least one program module of claim 13, the computing device further configured for providing, prior to the associating, an indication that the updates are to be associated with the checkpoint.

15. The hardware computing device and the at least one program module of claim 13, the computing device further configured for providing an indication that the subsequent updates are to be associated with a subsequent checkpoint.

16. The hardware computing device and the at least one program module of claim 13, the computing device further configured for writing the updates to the storage device at the second locations.

17. The hardware computing device and the at least one program module of claim 13 where the written checkpoint record includes a validation code configured for use in validating the written updates, and where the validation code is further configured for use in a recovery operation.

* * * * *